July 4, 1967  H. ALLEN  3,329,395
VALVE WITH SPRING CAGE SEAT RETAINER
Filed July 10, 1964  2 Sheets-Sheet 1
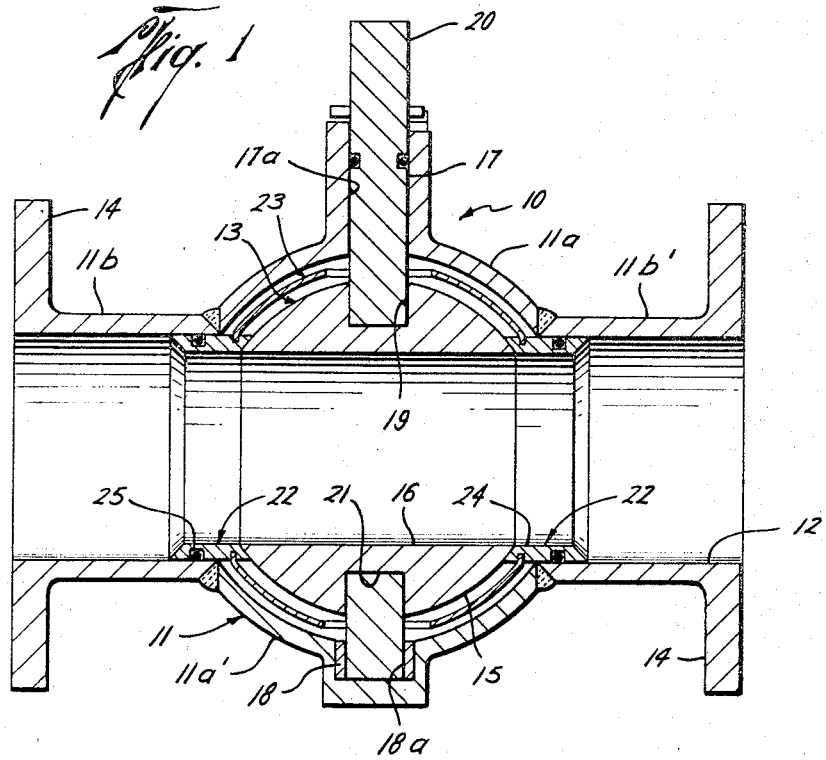
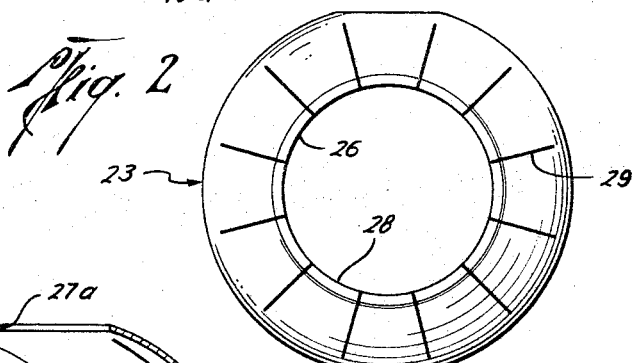
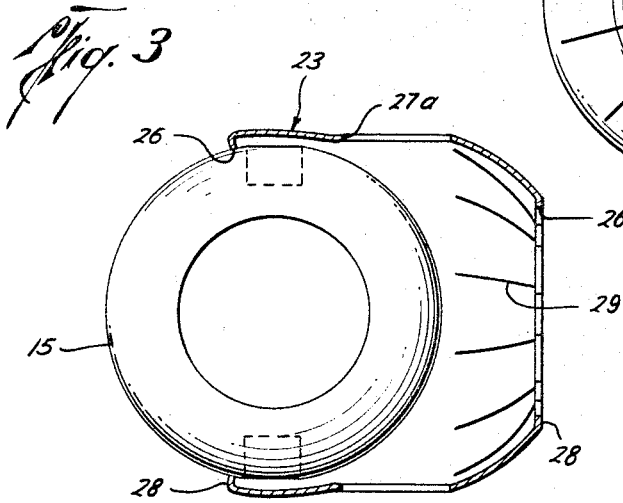
Herbert Allen
INVENTOR.
BY Browning, Simms, Hyer & Eickenroht
ATTORNEYS

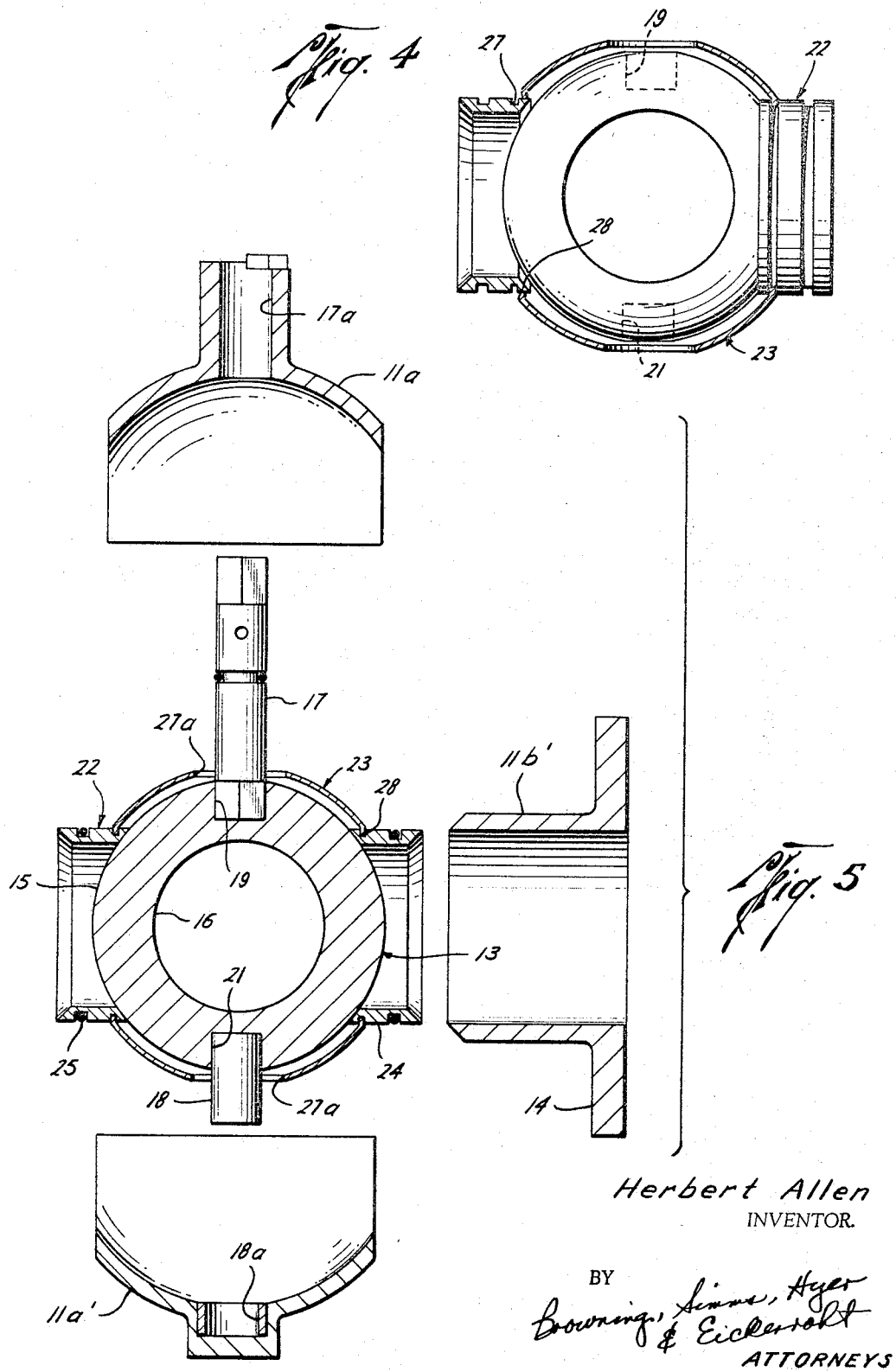

United States Patent Office 3,329,395
Patented July 4, 1967

3,329,395
VALVE WITH SPRING CAGE SEAT RETAINER
Herbert Allen, Houston, Tex., assignor to Cameron Iron Works, Inc., Houston, Tex., a corporation of Texas
Filed July 10, 1964, Ser. No. 381,854
7 Claims. (Cl. 251—174)

ABSTRACT OF THE DISCLOSURE

A valve comprising a valve body having a flowway through it and a valve member having stems mounting it within the body for movement between flowway controlling positions. An open-ended cage is disposed about the valve member and has holes in it to receive the stems. A valve seat is releasably connected in each open end of the cage so as to be held tightly against the side of the valve member independently of the valve body.

---

This invention relates generally to a valve having annular seats slidable within the flowway through the valve body for sealably engaging between the flowway and opposite sides of the valve member. More particularly, it relates to valves having improved means for initially holding the inner ends of such seats against the valve member, so that, upon closing of the valve, line pressure is effective to urge the seats into sealing engagement with the valve member.

Ordinarily, the inner end of each valve seat is held against an adjacent side of the valve member by a spring which is compressed between an outwardly facing surface of the seat and an inwardly facing shoulder on the valve body flowway. Usually, these springs are so located relative to a seal ring between the seat and valve body flowway as to be directly exposed to the line fluid in the flowway and thus subject to its erosive action. In any case, the use of these springs complicates both the fabrication and assembly of the valves in which they are used. Thus, the flowway in the valve body must be so formed as to provide the shoulder for retaining the spring compressed against the seat. Additionally, of course, during their assembly, the valve member, seats and valve body must be so arranged relative to one another as to place the desired compression in the springs.

Still further, valve bodies will expand and retract in response to fluctuating conditions of temperature and pressure. Since the washer type spring normally used for holding each seat against the valve member is engaged between a fixed shoulder on the seat body and a surface on the seat whose position is fixed by its engagement with the valve member, the holding force due to the spring will vary with the aforementioned changes in conditions. Consequently, the pressure with which the inner end of the seat engages the valve member will also vary from that at which it was originally set in the assembly of the valve. Excessively high pressure may make the valve member difficult to operate and excessively low pressure may permit leakage.

An object of this invention is to provide a valve in which the seats are held in engagement with the valve member without the use of such springs; and, more particularly, in which the seats are retained by a means which is not directly exposed to line fluid and which complicates neither the fabrication nor the assembly of the other parts of the valve.

Another object is to provide a valve in which the seats are yieldably held against the valve member in such a manner as to be unaffected by expansion and contraction of the valve body; and, more particularly, with a constant force.

A further object is to provide a retainer for the valve seats which not only accomplishes the foregoing objects, but also is of simplified construction and which requires only a minimum of space within the valve.

These and other objects are accomplished, in accordance with the illustrated embodiment of the invention, by a valve in which the seats are held against the opposite sides of the valve member by a means which, as distinguished from the springs heretofore employed, is independent of the valve body. Thus, there is a frame which extends about the valve member within the valve body and engages the seats to connect one to the other for yieldably retaining their inner ends tightly against the valve member. Since the frame is disposed in the space between the valve member and valve body, it is not directly exposed to the line fluid within the flowway. Also, inasmuch as the frame connects the seats to one another, it requires no engagement with the valve body. Still further, the valve member, seats and frame provide a "package" which is easily and quickly assembled within the valve body in the assembly of the valve.

In its preferred form, the frame comprises an open-ended cage fittable closely about the valve member so as to require a minimum of space within the valve body. Each seat has an annular groove about its outer circumference, and each open end of the cage has an inwardly projecting flange fitting within the groove. More particularly, these open ends of the cages are slotted so that each flange may be radially spread apart to receive or release a seat. Also the flanges are spaced apart a distance somewhat less than the distance between the grooves about the seats when the seats are engaged with opposite sides of the valve member, so that when the seats are so received, the flanges provide spring fingers which hold the seats yieldably against the valve member with a constant force.

One or both of the sides of the cage have holes therein to receive operating stems on the valve member. The cage may be made in segments and joined about the valve member and stems as by welding, or preferably the stems may be made removable from the valve member and the slots on at least one open end of the cage so formed as to permit such end to be radially spread apart an amount sufficient to move the cage laterally over the stemless valve member. In this preferred construction, the cage may be preformed as one piece, rather than as two or more segments to be connected to one another after fitting about the valve member.

In the drawings, wherein like reference characters are used throughout to designate like parts:

FIG. 1 is a longitudinal sectional view of a valve having seats retained in engagement with opposite sides of the valve member in accordance with the preferred embodiment of the present invention;

FIG. 2 is an end view of the cage which so retains the seat, but with the cage removed from within the valve body and prior to its disposal about the valve member;

FIG. 3 is a longitudinal sectional view of the cage during its disposal about the valve member;

FIG. 4 is another longitudinal section view of the cage upon disposal about the valve member, and with one valve seat retained thereby in engagement with one side of the valve member and the other valve seat during disposal thereof into position to be similarly retained in engagement with the other side of the valve member; and FIG. 5 is an exploded longitudinal sectional view of the valve with the seats retained by the cage in engagement with opposite sides of the valve member, and illustrating the process of assembling the "package" within the valve body.

With reference now to the details of the above described drawings, the valve shown in FIG. 1, and designated in its entirety by reference character 10, comprises a valve body 11 having a flowway 12 therethrough and a valve member 13 movable within the valve body to open and close the flowway. Flanges 14 or other suitable means on the opposite ends of the body permit it to be connected in a pipeline or other conduit.

In the illustrated embodiment of the invention, the valve member 13 comprises a ball 15 having an opening 16 therethrough and stems 17 and 18 on the upper and lower ends of the ball rotatable within bearings 17a and 18a on the upper and lower sides of the valve body. In the open position of the valve, opening 16 is aligned with flowway 12, as shown in FIG. 1, and in the closed position of the valve, such opening is rotated approximately 90° to dispose solid portions on opposite sides thereof across the flowway. This rotation is imparted to the valve member by means of the stem 17 which has a non-circular end removably fitted within the socket 19 of the upper side of the ball and an outer end which extends through the bearing 17a to permit it to be turned by any suitable tool. The lower stem 18 is also removably fitted within a socket 21 on the bottom side of the ball so that, upon removal of both stems, as shown in FIGS. 3 and 4, the maximum lateral dimension of the valve member is the diameter of the ball.

As will be described more fully hereinafter, and as shown in FIG. 5, the valve body 11 comprises longitudinally separated central portions 11a and 11a' on which both the upper and lower stem bearings 17a and 18a are mounted. These central portions are welded together to capture the ball, and tubular portions 11b and 11b' are welded at their inner ends to the open ends of the welded central body portions. More particularly, the inner surfaces of the central portions of the valve body are spherically shaped so as to provide a cavity which fits symmetrically about the ball.

As also shown in FIG. 1, a seat 22 as sealably slidable within the flowway 12 on each side of the valve member 13 and retained with its inner end in engagement with such side of the valve member by means of a cage 23. More particularly, each seat 22 comprises an annular body 24 having a groove about its outer circumference to receive a seal ring 25 for sealably engaging the flowway 12, and an opening through its inner circumference which forms a continuation of ball opening 16. As well known in the art, when the inner end of the body of the seat is held against the side of the valve member, either by the cage 23 or by springs held between the seat and a shoulder of the valve body, line pressure is effective over the area of the outer end of the seat upon closing of the valve member to urge the inner end of the seat into tight sealing engagement with the valve member.

As can be seen from the drawings, the cage 23 comprises a shell which is spherically shaped to fit symmetrically about the ball 15 and within the cavity of the valve body. Thus, the cage 23 requires only a minimum of space between the valve member and the valve body and does not, as a practical matter, require that the valve body be enlarged or that the ball be reduced to accommodate it.

The cage 23 has open ends 26 for releasably fitting within a groove 27 about the outer circumference of each valve seat and inwardly of the seal ring 25 so as to retain the seats in the manner described. It also has holes 27a in its upper and lower ends for freely receiving the valve stems 17 and 18 when the cage is disposed about the ball, as shown in FIGS. 1 and 5. More particularly, each open end of the cage is defined by an inwardly projecting flange 28 on the shell which in a radially unstressed position has an inner circumference less than that of the seat groove 27. However, the flanges and adjacent portions of the shell of the cage are slotted at 29 to permit the open end 26 to be stressed radially outwardly, as shown in FIG. 4, to permit insertion or removal of the seats.

More particularly, and as previously described, the flanges 28 on opposite ends of the shell of the cage 23 are spaced apart a distance somewhat less than the distance between grooves 27 about the seats 22 when the seats are engaged with opposite sides of the valve member. Thus, when both seats are retained by the cage 23, they are yieldably held thereby against the valve member independently of the valve body either directly or through the intermediary of a spring of the type previously used for so retaining the seats.

In the illustrated embodiment of the invention, the cage 23 comprises an integral body which may be moved laterally into a position about the ball upon removable of the stems 17 and 18 therefrom, as shown in FIG. 3. For this purpose, the slots 29 extend from the flanges 28 into the shell a distance sufficient to permit the openings 26 to be radially enlarged to a diameter at least as great as the diameter of the ball 15. Obviously, only one end of the shell need be slotted to this extent in order to so dispose the cage about the ball, although preferably both ends are slotted in similar fashion to facilitate assembly of the cage about the ball.

In the assembly of the "package" made up of the ball, seats and cage, and the subsequent assembly of the valve body about such package, the cage is first disposed about the stemless ball in the manner previously described and illustrated in FIG. 3. At this time one flange 28 is radially expanded or stressed to permit one seat 22 to be moved into retained position, as shown on the right-hand side of FIG. 4. Then the other flange 28 is radially enlarged to receive the second seat, as shown on the left-hand side of FIG. 4.

When the package is so assembled, the stems 17 and 18 are moved through the cage openings 27 and into the sockets 19 and 21, respectively. The bearings on the central body portions 11a and 11a' are then moved downwardly over the stems 17 and 18, respectively, until the longitudinally separated edges of such body portions are disposed adjacent one another. At this time, such edges of the central body portions are welded together to thereby capture the package with the cavity of the valve body, as shown in FIG. 1.

The tubular end portions 11b and 11b' of the valve body are then moved inwardly to dispose their inner ends adjacent the open ends of welded central body portions 11a and 11a'. These adjacent edges are then welded together, as shown in FIG. 1, to complete the assembly of the valve. As will be apparent of the foregoing, very little alignment is required since the package need only be oriented to permit the flowways 12 through the tubular body portions to be moved over the outer circumferences of the seats 22. This is done while the valve member is held in its properly mounted position by the disposal of its stems 17 and 18 within the bearings 17a and 18a.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A valve, comprising a valve body having a flowway therethrough, a valve member movable within the valve body for controlling the flowway, an annular seat in the flowway on each side of the valve member, and means holding the ends of the seats against the sides of the valve member independently of said valve body.

2. A valve, comprising a valve body having a flowway therethrough, a valve member rotatable within the valve body for opening and closing the flowway, an annular seat in the flowway on each side of the valve member, and means connecting the seats to one another for yieldably holding their inner ends tightly against opposite sides of the valve member independently of said valve body.

3. A valve, comprising a valve body having a flowway therethrough, a valve member within the valve body, means for rotating the valve member between flowway opening and closing positions, an annular seat in the flowway on each side of the valve member, and a frame extending within the valve body and about the valve member to connect one seat to the other for yieldably holding each said seat against a side of the valve member independently of said valve body.

4. A valve subassembly, comprising a valve member having an opening therethrough, at least one stem on the valve member for imparting rotation thereto, a pair of annular seats each having an end engageable with a side of the valve member, and an open-ended cage about the valve member having a hole therein to receive the stem and means about its open ends releasably connected to the seats for holding said seats tightly against said sides of the valve member.

5. As in claim 4, wherein each seat has an annular groove about its outer circumference, and said seat holding means comprises an inwardly extending flange fitting within each groove.

6. As in claim 5, wherein the open ends of the cage are slotted to permit them to be spread for releasably fitting within the seat grooves.

7. As in claim 6, wherein the stem is removable from the valve member, and at least one open end of the cage is spreadable to permit the cage to be moved laterally into place about the valve member.

References Cited
UNITED STATES PATENTS

| | | | |
|---|---|---|---|
| 2,573,177 | 10/1951 | Bohlen | 251—315 X |
| 3,107,685 | 10/1963 | Scaramucci | 251—315 X |
| 3,214,135 | 10/1965 | Hartmann | 251—315 |

FOREIGN PATENTS 915,764   7/1954   Germany.

CLARENCE R. GORDON, *Primary Examiner.*